US008814673B1

(12) United States Patent
Brunell et al.

(10) Patent No.: US 8,814,673 B1
(45) Date of Patent: Aug. 26, 2014

(54) PRESENTING LIGHTING CONTENT IN WAGERING GAME SYSTEMS

(75) Inventors: Edward G. Brunell, Chicago, IL (US); Paul J. Radek, Naperville, IL (US)

(73) Assignee: WMS Gaming, Inc., Waukegan, IL (US)

( * ) Notice: Subject to any disclaimer, the term of this patent is extended or adjusted under 35 U.S.C. 154(b) by 215 days.

(21) Appl. No.: 13/094,701

(22) Filed: Apr. 26, 2011

Related U.S. Application Data

(60) Provisional application No. 61/327,871, filed on Apr. 26, 2010.

(51) Int. Cl.
*G06F 17/00* (2006.01)
*G06F 19/00* (2011.01)

(52) U.S. Cl.
USPC .................. 463/30; 463/16; 463/20; 463/42; 362/458

(58) Field of Classification Search
USPC ............ 463/1, 16–20, 29–31, 40–42, 46, 47; 362/23.02, 212, 234, 236, 253, 458, 362/600, 602, 800
See application file for complete search history.

(56) References Cited

U.S. PATENT DOCUMENTS

| | | | |
|---|---|---|---|
| 5,483,631 | A | 1/1996 | Nagai et al. |
| 5,633,933 | A | 5/1997 | Aziz |
| 6,040,831 | A | 3/2000 | Nishida |
| 6,081,266 | A | 6/2000 | Sciammaella |
| 6,146,273 | A | 11/2000 | Olsen |
| 6,217,448 | B1 | 4/2001 | Olsen |
| 6,647,119 | B1 | 11/2003 | Slezak |
| 6,843,723 | B2 | 1/2005 | Joshi |
| 6,939,226 | B1 | 9/2005 | Joshi |
| 6,960,136 | B2 | 11/2005 | Joshi et al. |
| 6,972,528 | B2 | 12/2005 | Shao et al. |
| 6,974,385 | B2 | 12/2005 | Joshi et al. |
| 6,991,543 | B2 | 1/2006 | Joshi |

(Continued)

FOREIGN PATENT DOCUMENTS

| | | |
|---|---|---|
| EP | 1439507 | 7/2004 |
| WO | WO-2004014501 | 2/2004 |

(Continued)

OTHER PUBLICATIONS

U.S. Appl. No. 12/797,756, filed Jun. 10, 2010, Berry, Robert G., et al., Dec. 16, 2010.

(Continued)

*Primary Examiner* — Milap Shah
(74) *Attorney, Agent, or Firm* — DeLizio Gilliam, PLLC

(57) ABSTRACT

Some embodiments of the inventive subject matter include operations for presenting a lighting show in a wagering game system. The operations can include receiving, over a first network, a playlist identifier that identifies a playlist, where the playlist is associated with a first group of lighting commands for presenting lighting effects on lighting devices in the wagering game system. The operations can also include generating the first group of lighting commands, and receiving, over the first network, a second group of lighting commands for presenting the lighting effects on the lighting devices in the wagering game system. The operations can also include generating, based on the first and second groups of lighting commands, instructions specific to the lighting devices, and transmitting, over a second network, the instructions for execution by one or more lighting controllers connected to the lighting devices, wherein the execution causes the lighting effects.

15 Claims, 8 Drawing Sheets

(56) References Cited

U.S. PATENT DOCUMENTS 6,997,803 B2 2/2006 LeMay et al.
7,082,572 B2 7/2006 Pea et al.
7,112,139 B2 9/2006 Paz Barahona et al.
7,181,370 B2 * 2/2007 Furem et al. .................. 702/188
7,228,190 B2 6/2007 Dowling et al.
7,364,508 B2 4/2008 Loose et al.
7,367,886 B2 5/2008 Loose et al.
7,449,839 B1 11/2008 Chen et al.
7,479,063 B2 1/2009 Pryzby et al.
7,495,671 B2 * 2/2009 Chemel et al. ................ 345/594
7,550,931 B2 * 6/2009 Lys et al. ...................... 315/291
7,666,091 B2 2/2010 Joshi et al.
7,682,249 B2 3/2010 Winans et al.
7,811,170 B2 10/2010 Winans et al.
7,867,085 B2 * 1/2011 Pryzby et al. ................... 463/30
2001/0021666 A1 9/2001 Yoshida et al.
2002/0010018 A1 1/2002 Lemay et al.
2002/0055978 A1 5/2002 Joon-Boo et al.
2002/0160826 A1 10/2002 Gomez et al.
2003/0002246 A1 * 1/2003 Kerr ............................. 361/683
2003/0007648 A1 1/2003 Currell
2003/0017865 A1 1/2003 Beaulieu et al.
2003/0130033 A1 7/2003 Loose
2003/0132722 A1 7/2003 Chansky et al.
2004/0072610 A1 4/2004 White et al.
2004/0160199 A1 8/2004 Morgan et al.
2004/0166932 A1 * 8/2004 Lam et al. ....................... 463/30
2004/0209692 A1 10/2004 Schober et al.
2005/0043090 A1 2/2005 Pryzby et al.
2005/0054440 A1 3/2005 Anderson et al.
2005/0077843 A1 4/2005 Benditt
2005/0116667 A1 6/2005 Mueller et al.
2005/0128751 A1 6/2005 Roberge et al.
2005/0153780 A1 * 7/2005 Gauselmann .................. 463/47
2005/0164785 A1 7/2005 Connelly
2005/0164786 A1 7/2005 Connelly
2005/0164787 A1 7/2005 Connelly
2005/0164788 A1 7/2005 Grabiec
2005/0174473 A1 8/2005 Morgan et al.
2005/0239545 A1 10/2005 Rowe
2005/0248299 A1 11/2005 Chemel et al.
2005/0275626 A1 12/2005 Mueller et al.
2005/0277469 A1 12/2005 Pryzby et al.
2005/0282631 A1 12/2005 Bonney et al.
2006/0009285 A1 1/2006 Pryzby et al.
2006/0022214 A1 2/2006 Morgan et al.
2006/0046829 A1 3/2006 White
2006/0076908 A1 4/2006 Morgan et al.
2006/0253781 A1 11/2006 Pea et al.
2007/0004510 A1 1/2007 Underdahl et al.
2007/0008711 A1 1/2007 Kim
2007/0032288 A1 2/2007 Nelson et al.
2007/0036368 A1 2/2007 Hettinger et al.
2007/0111776 A1 5/2007 Griswold et al.
2007/0189026 A1 8/2007 Chemel et al.
2007/0218970 A1 9/2007 Patel et al.
2007/0218974 A1 9/2007 Patel et al.
2007/0219000 A1 9/2007 Aida
2007/0291483 A1 12/2007 Lys
2007/0293304 A1 12/2007 Loose et al.
2008/0039213 A1 2/2008 Cornell et al.
2008/0070685 A1 3/2008 Pryzby et al.
2008/0094005 A1 4/2008 Rabiner et al.
2008/0113715 A1 5/2008 Beadell et al.
2008/0113796 A1 5/2008 Beadell et al.
2008/0113821 A1 5/2008 Beadell et al.
2008/0161108 A1 7/2008 Dahl et al.
2008/0176647 A1 * 7/2008 Acres ............................. 463/25
2008/0231203 A1 9/2008 Budde et al.
2008/0274793 A1 * 11/2008 Seelig et al. ................... 463/25
2008/0278946 A1 11/2008 Tarter et al.
2008/0288607 A1 11/2008 Muchow
2008/0309259 A1 12/2008 Snijder et al.
2009/0009997 A1 1/2009 Sanfilippo et al.
2009/0023485 A1 1/2009 Ishihata et al.
2009/0149242 A1 * 6/2009 Woodard et al. ................ 463/21
2009/0170597 A1 7/2009 Bone et al.
2009/0197673 A1 8/2009 Bone et al.
2009/0206773 A1 * 8/2009 Chang ........................... 315/297
2009/0270167 A1 * 10/2009 Ajiro et al. ...................... 463/27
2009/0298579 A1 12/2009 Radek et al.
2009/0318223 A1 12/2009 Langridge et al.
2010/0022298 A1 1/2010 Kukita
2010/0022305 A1 1/2010 Yano
2010/0029385 A1 2/2010 Garvey et al.
2010/0031186 A1 2/2010 Tseng et al.
2010/0075750 A1 3/2010 Bleich et al.
2010/0113136 A1 5/2010 Joshi et al.
2010/0171145 A1 7/2010 Morgan et al.
2010/0213876 A1 8/2010 Adamson et al.
2010/0234107 A1 9/2010 Fujimoto et al.
2010/0277079 A1 11/2010 Van Der Veen et al.
2010/0309016 A1 12/2010 Wendt et al.
2010/0317437 A1 12/2010 Berry et al.
2011/0035404 A1 2/2011 Morgan et al.
2011/0045905 A1 2/2011 Radek
2011/0050101 A1 3/2011 Bailey et al.
2011/0070948 A1 3/2011 Bainbridge et al.
2011/0118018 A1 5/2011 Toyoda
2011/0118034 A1 * 5/2011 Jaffe et al. ...................... 463/42
2011/0190052 A1 8/2011 Takeda et al.
2011/0201411 A1 * 8/2011 Lesley et al. ................... 463/25
2012/0009995 A1 1/2012 Osgood
2012/0040738 A1 2/2012 Lanning et al.
2012/0122571 A1 * 5/2012 DeSimone et al. ............. 463/31
2012/0129601 A1 5/2012 Gronkowski et al.
2012/0178523 A1 7/2012 Greenberg et al.
2012/0178528 A1 7/2012 Brunell et al.
2013/0005458 A1 * 1/2013 Kosta et al. ..................... 463/31
2013/0184078 A1 7/2013 Brunell et al.

FOREIGN PATENT DOCUMENTS

WO WO2004075128 9/2004
WO WO2004075129 9/2004
WO WO2004086320 10/2004
WO WO2005113089 12/2005
WO WO2005114598 12/2005
WO WO2005114599 12/2005
WO WO2005117647 12/2005
WO WO2006017444 2/2006
WO WO2006017445 2/2006
WO WO2006033941 3/2006
WO WO2006039284 4/2006
WO WO2006039323 4/2006
WO WO2006125013 11/2006
WO WO2007022294 2/2007
WO WO2007022343 2/2007
WO WO-2007061904 5/2007
WO WO2007133566 11/2007
WO WO2008057538 5/2008
WO WO2008063391 5/2008
WO WO2008137130 11/2008
WO WO2009054930 4/2009
WO WO2010048068 4/2010
WO WO-2011005797 1/2011
WO WO2011005798 1/2011
WO WO2011014760 2/2011
ZA 20041110 8/2005

OTHER PUBLICATIONS

U.S. Appl. No. 12/860,467, filed Aug. 20, 2010, Radek, Paul J.
U.S. Appl. No. 12/965,749, filed Dec. 10, 2010, Brunell, Edward G., et al.
U.S. Appl. No. 12/971,544, filed Dec. 17, 2010, Brunell, Edward G., et al.
U.S. Appl. No. 13/094,701, filed Apr. 26, 2011, Brunell, Edward G., et al.
U.S. Appl. No. 13/094,811, filed Apr. 26, 2011, Brunell, Edward G., et al.
U.S. Appl. No. 13/094,560, filed Apr. 26, 2011, Brunell, Edward G., et al.

(56) References Cited

OTHER PUBLICATIONS

"PCT Application No. PCT/US10/41112 International Search Report", Sep. 2, 2010 , 11 pages.
"PCT Application No. PCT/US10/43886 International Search Report", Sep. 16, 2010 , 12 pages.
"U.S. Appl. No. 13/094,560 Office Action", Mar. 30, 2012 , 13 pages.
"U.S. Appl. No. 13/094,811 Office Action", Apr. 3, 2012 , 16 pages.
"U.S. Appl. No. 13/094,811 Office Action", Jun. 21, 2013 , 19 pages.
"U.S. Appl. No. 13/382,783 Office Action", Jul. 25, 2013 , 20 Pages.
"U.S. Appl. No. 12/860,467 Office Action", Jan. 17, 2013 , 16 pages.
"U.S. Appl. No. 12/965,749 Office Action", Nov. 8, 2012 , 30 pages.
"U.S. Appl. No. 12/971,544 Office Action", Nov. 6, 2012 , 43 pages.
"PCT Application No. PCT/US10/41111 International Preliminary Report on Patentability", Oct. 24, 2011 , 13 pages.
"PCT Application No. PCT/US10/41111 International Search Report", Sep. 1, 2010 , 12 pages.
"PCT Application No. PCT/US10/41112 International Preliminary Report on Patentability", Aug. 31, 2012 , 4 pages.
"PCT Application No. PCT/US10/43886 International Preliminary Report on Patentability", May 3, 2012 , 4 pages.
"U.S. Appl. No. 12/965,749 Final Office Action", Apr. 22, 2013 , 30 Pages.
"U.S. Appl. No. 12/971,544 Final Office Action", Mar. 14, 2013 , 38 pages.
"U.S. Appl. No. 13/204,225 Office Action", Feb. 27, 2013 , 19 pages.
"U.S. Appl. No. 13/204,225 Office Action", Jun. 22, 2012 , 23 pages.
"U.S. Appl. No. 13/382,738 Office Action", Feb. 7, 2013 , 41 pages.
"U.S. Appl. No. 13/382,783 Office Action", Feb. 28, 2012 , 26 pages.
Gusella, Riccardo et al., "An Electron Algorithm for a Distributed Clock Synchronization Program", *Berkley* http://www.eecs.berkeley.edu/Pubs/TechRpts/1986/CSD-86-275.pdf Dec. 1985 , 19 pages.

* cited by examiner

PRESENTING LIGHTING CONTENT IN WAGERING GAME SYSTEMS

RELATED APPLICATIONS

This application claims the priority benefit of U.S. Provisional Application Ser. No. 61/327,871 filed Apr. 26, 2010.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2011, WMS Gaming, Inc.

FIELD

Embodiments of the inventive subject matter relate generally to wagering game systems, and more particularly to wagering game systems capable of controlling and presenting lighting content.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines.

Some wagering game systems enhance player experiences by using lighting effects, such as colored lighting, strobe lighting, spot lighting, etc. Such systems may present various lighting effects in response to large jackpot wins, game events (e.g., a particular slot reel combination), and other events in the systems. As wagering game systems grow larger and more sophisticated, so grows the need for better techniques for controlling and presenting lighting content.

BRIEF DESCRIPTION OF THE FIGURES

Embodiments of the invention are illustrated in the Figures of the accompanying drawings in which.

DESCRIPTION OF THE EMBODIMENTS

The following sections describe embodiments of the inventive subject matter.

Introduction

Wagering game systems typically include wagering game machines, overhead signs, audio speakers, display devices, lighting devices (e.g., spot lights, light bars, etc.), and more. In addition to conducting wagering games, such systems often present entertaining media content, such as music, motion picture video, animation, and more. In some instances, these systems also use lighting effects to enhance player experiences. For example, some systems use lighting effects to: induce excitement when players win jackpots, draw players to certain areas of a casino, create ambiance, etc.

Figure 1:
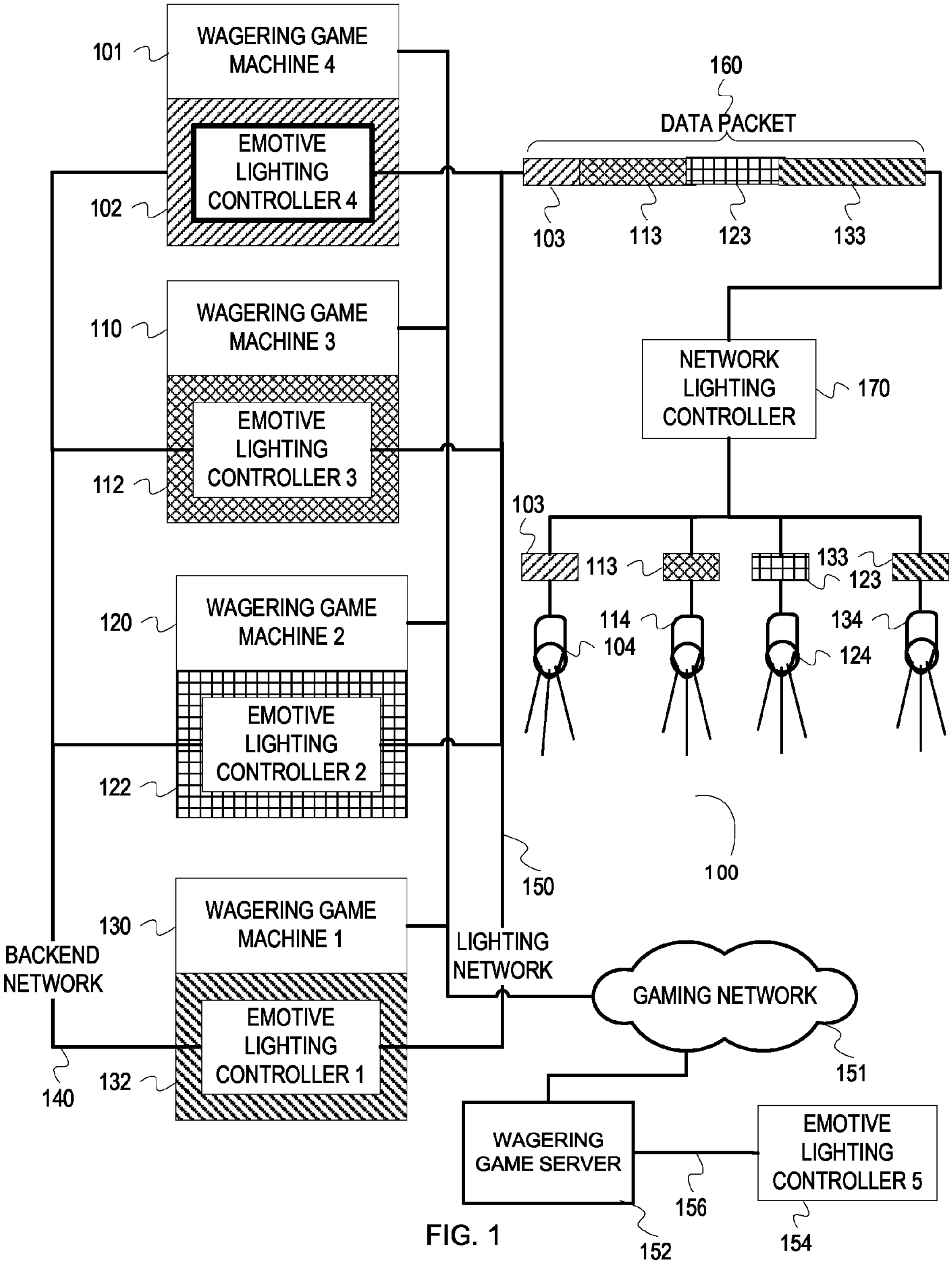
FIG. 1 shows a wagering game system capable of presenting lighting effects, according to some embodiments of the invention.

Embodiments of the inventive subject matter include specialized components for presenting emotive lighting and other lighting effects. FIG. 1 shows a wagering game system capable of presenting lighting effects, according to some embodiments of the invention. In FIG. 1, a wagering game system 100 includes wagering game machines 101, 110, 120, & 130, emotive lighting controllers 102, 112, 122, & 132, a network lighting controller 170, a dedicated lighting network 150, and a backend network 140. The system 100 also includes lighting devices (e.g., spot lights) 104, 114, 124, & 134. The emotive lighting controllers initiate lighting effects (e.g., in response to the game events), while other components facilitate presentation of the lighting effects.

In some embodiments, one of the emotive lighting controllers (ELCs) acts as a "host" (e.g., ELC 102). In a process for presenting lighting effects, the non-host ELCs transmit lighting commands to the host ELC. In turn, the host ELC translates the lighting commands into lighting device instructions, and transmits the instructions to the lighting devices for execution.

To provide fault recovery, the ELCs can maintain state information that may be useful if the host ELC is unavailable. In some embodiments, all non-host ELCs "listen for" and record all lighting commands sent to the host ELC. All non-host ELCs also "listen for" and record all lighting device instructions transmitted for execution on the lighting devices. As a result, the non-host ELCs maintain state information that may be useful if the host ELC becomes unavailable. If the host becomes unavailable, a new host is selected from the non-hosts. The new host can use its state information to continue processing lighting commands from where the old host left-off. Although some embodiments of the ELCs maintain state information, other embodiments do not.

While some embodiments provide fault recovery, other embodiments of the inventive subject matter present lighting effects that enhance player experiences. Some embodiments present multimedia shows that include lighting effects synchronized with audio and/or video content. Yet other embodiments present distributed lighting shows that utilize remotely located lighting components. Such distributed lighting shows may present lighting effects near a bank of wagering game machines, in particular areas in a casino, and/or throughout an entire casino.

Although this introduction describes some embodiments of the inventive subject matter, other embodiments are described in more detail below.

Systems and Operations

This section further describes FIG. 1, presents FIGS. 2-8, and describes other embodiments of the inventive subject matter.

Example System Architecture

As noted above, the wagering game system 100 includes wagering game machines 101, 110, 120, & 130, emotive lighting controllers 102, 112, 122, & 132, a network lighting controller 170, a dedicated lighting network 150, and a backend network 140. The system 100 also includes a wagering game server 152, which is connected to another emotive lighting controller 154 via another lighting network 156. The wagering game machines 101, 110, 120, & 130 and wagering game server 152 are connected to a gaming network 151.

As shown, each wagering game machine is paired with an emotive lighting controller. The emotive lighting controllers ("ELCs") 132, 222, 112, & 102 can be internal or external to their respective wagering game machines. The ELCs 132, 122, 112, & 102 can control local and remote lighting devices. That is, the ELCs can control lighting devices residing on or about the wagering game machines, and lighting devices located about a casino.

In FIG. 1, the ELCs are connected via two networks—the lighting network 150 and the backend network 140. In some embodiments, the lighting network 150 facilitates communications between the ELCs and the network lighting controller 170, whereas the backend network 140 facilitates communications among the ELCs.

The lighting network can utilize RS-485 cabling, and support the DMX512 protocol. The lighting network 150 can also utilize other cabling and support other protocols. In some embodiments, the lighting network 150 includes an RS-485 cable that daisy chains the ELCs 132, 122, 112, & 102, and the network lighting controller 170. The ELCs and network lighting controller 170 can include RS-485 transceivers, which facilitate bi-directional communications across the lighting network 150. In some embodiments (e.g., embodiments that include RS-485 cabling), the lighting network 150 does not support multiple simultaneous transmissions between the ELCs and the network lighting controller 170. Thus, they wagering game server 152 (or another component) can appoint one of the ELCs as a host (e.g. ELC 102), where the host transmits lighting device instructions to the network lighting controller 170. However, before the host ELC transmits instructions to controller 170, the host ELC receives lighting commands from the other ELCs over the backend 140. The backend network 140 can include any suitable connection technology, such as Bluetooth, 802.11, Ethernet, RS-485, etc. The following discussion of FIG. 1 will provide more details about how the ELCs facilitate lighting effects.

In some instances, the ELCs include "playlists" corresponding to various events that occur in the system 100. The playlists can include scripts indicating lighting effects and other media content. For example, ELC 132 may have a playlist associated with a particular game's jackpot win event, where the playlist identifies a first script that calls for rotating the spotlight 134 in a circular motion, and a second script that calls for pointing the spotlight 134 at the wagering game machine 130. The ELC 132 can execute the scripts and generate lighting commands for rotating and pointing the spotlight 134, as defined in the scripts. In turn, the ELC 132 can transmit the lighting commands to the host ELC 102 via the backend network 140.

The host ELC 102 can receive the lighting commands over the backend network 140. After receiving commands, the host ELC 102 can use the commands to generate instructions for the network lighting controller 170. In some instances, the host ELC 102 generates the instructions by translating the commands (received from ELC 132) into a series of instructions understood by the network lighting controller 270. For the command indicating a rotation of the lighting device 134, the translation process may include determining a set of positions that represent one rotation. The host can generate one instruction for each position, and transmit the instructions to the network lighting controller 170 via the lighting network 150.

In some embodiments, the host ELC 102 generates the instructions based on the lighting network's frame rate. In generating the instructions (based on the commands), the host ELC 102 can determine a number of frames for completing a command. A light rotation command may indicate that the lighting device 134 should be rotated for 30 seconds. If the frame rate is 40 frames per second, and the ELC host 102 can transmit one instruction per frame, 1200 frames are needed to complete the rotation command. Also, for the rotation command, the host ELC 102 can determine a series of positions for the spotlight 134 based on a number of rotations indicated in the command and a rotation radius. The radius can be indicated explicitly in the command or otherwise available for determination. The host ELC 102 can determine the circumference based on the radius, and evenly divide the circumference into a number of positions based on the number of frames needed to complete the command. Then, the host 102 can generate a series of instructions indicating the positions, and transmit the instructions to the network lighting controller 170 at a rate of 40 instructions per second. As noted above, the host 102 transmits the instructions via the lighting network 150.

As activity on the wagering game system 100 increases, multiple ELCs may send lighting commands to the host ELC 102. The host ELC 202 can receive the commands over the backend network 140. In turn, the host can generate instructions for each of the commands, and aggregate the instructions into data packets. FIG. 1 depicts an example data packet 160. In some embodiments, the data packet 160 includes 512 bytes, and is formatted according to the DMX512 protocol. Segments of the data packet can be reserved for different ELCs. For example, the data packet's first 32 bytes may be reserved for instructions generated from commands from the ELC 132, the second 64 bytes may be reserved for ELC 122, etc. Thus, different data packet segments may be associated with different ELCs. As depicted in FIG. 1 (see hatching), ELC 102 is associated with packet segment 103, ELC 112 is associated with packet segment 113, ELC 122 is associated with packet segment 123, and ELC 132 is associated with packet segment 133. The packet segment sizes can differ, as needed. For example, ELCs may have larger segments in the data packet 160 if they control a large number lighting devices, or if they control lighting devices requiring a large number of parameters.

In FIG. 1, the lighting devices 134, 124, 114, & 104 are associated with the ELCs 132, 122, 112, & 102, respectively (see hatching). As noted, the ELCs 132, 122, 112, & 102 are assigned the data packet segments 133, 123, 113, & 103, respectively. The host 102 aggregates the instructions into the data packet 160 based on the segments associated with the ELCs. For example, instructions generated from commands of the ELC 122 are inserted into segment 123, whereas instructions generated from commands of the host ELC 102 are inserted into the segment 103. After inserting all the instructions into the data packet 160, the host ELC 202 transmits, via the lighting network 150, the data packet to the network lighting controller 170.

In response to receiving the data packet 160, the network lighting controller 170 configures the lighting devices 104, 114, 124, & 134 according to the instructions indicated in the data packet 160. As noted above, the instructions in segments 103, 113, 123, & 133 correspond to the lighting devices 104, 114, 124, & 134, respectively. Therefore, if instructions in the segment 103 indicate positions for the lighting devices 104, the network lighting controller 170 will move the lighting device 104 in accordance with the instructions. The controller 170 will also move the other lighting devices.

As noted above, the ELCs record state information, so they can continue presenting playlists if a host ELC becomes unavailable. As the host ELC 202 transmits data packets 160 to the network lighting controller 170, the host 102 can also transmit (via the lighting network 150) the data packets to the other ELCs for recordation. Similarly, all the ELCs can store their own commands, and they can transmit their commands to each other (via the backend network 140) for recordation. In some embodiments, to maintain a rich set of state information, the non-host ELCs 132, 122, & 112 generate instructions from the commands, and aggregate the instructions into packets (just like the host 102). Each of the non-host ELCs stores the packets as state information rather than transmitting them to the network lighting controller 170. To avoid storing redundant items, after ELCs receive packets from the host 102, they can delete their locally stored copies. If the non-host ELCs do not receive packets from the host 102 for a given time period, the non-host ELCs can assume the host 102 has failed, and notify the wagering game server 152 (or another component) that they are available to become the host. In response, the wagering game server 152 can select a new host. In some embodiments, the wagering game server 152 selects a new host randomly from those that indicated availability. Alternatively, the wagering game server 152 can select the new host based which of the available ELCs has been most reliable. The new host ELC can continue transmitting instructions to the network lighting controller 170 where the previous host left-off.

Although FIG. 1 depicts a single network lighting controller 170, multiple network lighting controllers may be present in the dedicated lighting network 150. If there are multiple network lighting controllers, the host ELC 102 can transmit multiple packets per frame, where one packet is transmitted to each of the multiple network lighting controllers.

Building on the description of FIG. 1, this discussion continues with an example of how ELCs can initiate and control a light show. As described above, the ELCs can initiate the light show by generating and transmitting lighting commands and instructions. In the following example, the light show draws attention to a particular wagering game machine by shining ceiling-mounted spot lights and flashing adjacent light bars.

Example Light Show

Figure 2:
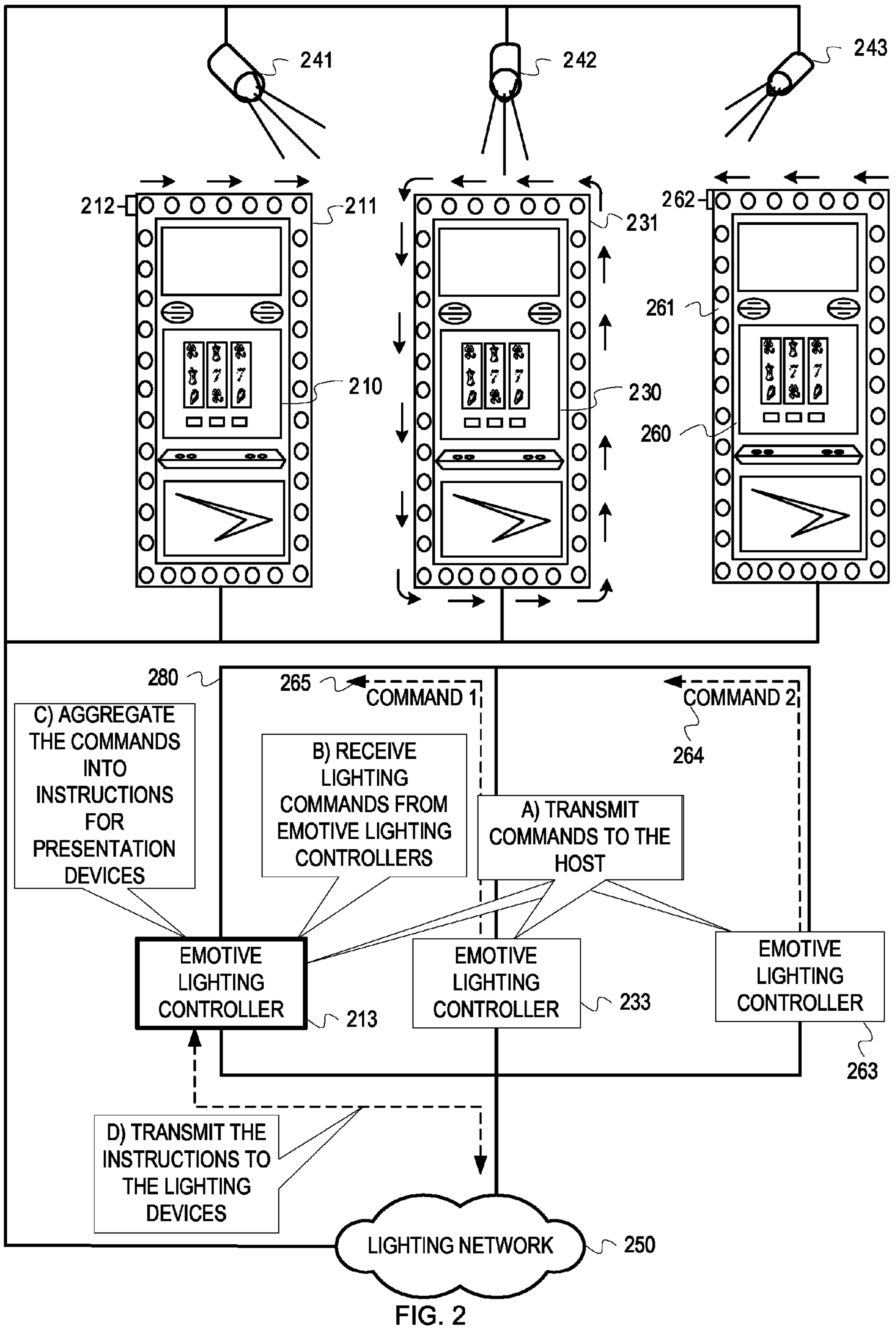
FIG. 2 is block diagram showing dataflow and operations for presenting lighting effects, according to some embodiments of the invention.

FIG. 2 is block diagram showing dataflow and operations for presenting lighting effects, according to some embodiments of the invention. FIG. 2 shows a wagering game system 200, which includes a bank of wagering game machines 210, 230, & 260. Each of the wagering game machines 210, 230, & 260 are associated with lighting devices. The lighting devices can include spotlights, LED arrays, wagering game machine cabinet lights, marquee lights, chair lighting, reel illuminator lights, etc. In the example shown in FIG. 2, the wagering game machine 210 is associated with a spotlight 241 and an LED array 211. The wagering game machine 230 is associated with a spotlight 242 and an LED array 231. The wagering game machine 260 is associated with a spotlight 243 and an LED array 261. As shown, the LED arrays 211, 231, & 261 are mounted on the wagering game machines' cabinets. In other embodiments, the ELCs can be associated with different lighting devices.

The system 200 also includes ELCs 213, 233, & 263. The ELC 213 controls the lighting devices 241 & 211 associated with the wagering game machine 210. The ELC 233 controls the lighting devices 242 & 231 associated with the wagering game machine 230, and the ELC 263 controls the lighting devices 243 & 261 associated with the wagering game machine 260. The ELCs 213, 233, & 263 are connected through a backend network 280. The backend network 280 can support the Ethernet protocol. The ELCs 213, 233, & 263 are also connected to a lighting network 250. The lighting network 250 can support the DMX 512 protocol. In some embodiments, one of the ELCs acts as a host ELC, where the host transmits lighting instructions over the lighting network 250, as similarly described vis-à-vis FIG. 1. In FIG. 2, the host ELC is indicated by a bold line (see 213).

The dataflow and operations for presenting a light show are shown in stages A-D. During stage A, the ELCs 213, 233 & 263 generate lighting commands in accordance with playlists associated with the ELCs. In some instances, a wagering game server (not shown) (or a wagering game machine or other component) selects the playlists in response to an events, such as win events, casino-wide celebration events, bonus events, etc. For example, a wagering game server can select particular playlists after detecting a jackpot win. The wagering game server can notify the ELCs about the playlist selection. The ELCs 213, 233, & 263 can generate the lighting commands based on executing scripts indicated by the playlists. The ELCs 233 & 263 can transmit the lighting commands to the host ELC 213. In the example shown in FIG. 2, the ELC 233 transmits a lighting command 265 (shown as "command 1"), and the ELC 263 transmits a lighting command 264 ("command 2" in FIG. 2) to the host ELC 213.

Just as the non-host ELCs generate commands, the host ELC 213 can also generate lighting commands based on the playlist(s). Because the host ELC 213 does not actually need to transmit commands, it may simulate transmission by placing the lighting commands in a local buffer that receives commands from the other ELCs.

The lighting commands can indicate actions for each of the lighting devices associated with the wagering game machines 210, 330, & 260. In FIG. 2, the command 264 indicates that the spotlight 242 should point at the wagering game machine 230 and the LED array 231 should present a circling light pattern. Similarly, the command 265 indicates that the spotlight 243 should point at the wagering game machine 230, and that the top portion 262 of the LED array 361 should flash in a pattern moving toward the wagering game machine 230. The host ELC's lighting command indicates that the spotlight 241 should point at the wagering game machine 230, and that the top portion 212 of the LED array 211 should flash in a pattern moving toward the wagering game machine 230.

At stage B, the host ELC 213 receives the commands 264 & 265. The host ELC 213 also "receives" its own lighting command. To maintain state information, all non-host ELCs receive the commands sent to the host, as similarly described vis-à-vis FIG. 1. The non-host ELCs maintain state information so they can assume responsibilities of the host ELC 213, should the host ELC 213 become unavailable.

At stage C, the host ELC 213 aggregates the commands and generates instructions for the lighting devices 241, 242, 243, 211, 231, & 261. Such aggregation can include translating the commands into a series of instructions that can be understood by the lighting devices 241, 242, 243, 211, 231, & 261 and/or network lighting controllers associated with the lighting devices. For example, instructions for the spotlights 241, 242, & 243 can include indicia for position, brightness, color, etc. As another example, instructions for the LED arrays 211, 231, & 261 can indicate a pattern (e.g., blinking, circulating, chasing, etc.), direction for pattern, active LED device portions, colors, etc.

As part of generating the lighting instructions, the host ELC 213 determines positions for the spotlights 241, 242, 243. In some embodiments, the host ELC 213 can determine the positions based on identifiers in the commands received from the ELCs (or from itself). In this example, the commands instruct the spotlights to point toward the wagering game machine 230. In some embodiments, the host ELC 213 looks-up a geographic position of the wagering game machine 230. Alternatively, the commands may indicate the position. The host ELC 213 can generate a first set of lighting instructions that cause the spotlights 241, 242, & 243 to move to the positions, thus pointing at the machine 230. The host 213 can insert the first set of instructions into a data packet (e.g., a DMX512 data packet). As described above, sections of the data packet may be reserved for each of the ELCs.

Also as part of generating the lighting instructions, the host ELC 213 can generate a second set of instructions to initiate lighting effects on the LED arrays 211, 231, & 261. The host ELC 213 can generate the second set of instructions based on the commands 264 & 265, and its own instructions. The commands can include parameters for programming the LED arrays 211, 231, & 261 (e.g., parameters indicating patterns, active portions of the LED arrays, etc.). Based on the commands, the host ELC 213 determines that the top sections 212 & 262 of the LED arrays 211 & 261 should be active, whereas all sections of the LED array 231 should be active. The host ELC 213 also determines that the pattern for the LED array 231 should be circulating, while the pattern direction should be clockwise for LED array 211, and counterclockwise for LED array 231. The host ELC 213 generates the appropriate lighting instructions, and inserts them into the data packet along with the first set of instructions.

At stage D, the host ELC 213 transmits, via the lighting network 250, the instructions to the lighting devices 241, 242, 243, 211, 231, & 261. Transmitting the instructions can comprise transmitting the data packet, which contains the first and second sets of instructions. In some embodiments, the host ELC 213 transmits the instructions to a network lighting controller (not shown) associated with the lighting devices 241, 242, 243, 211, 231, & 261. In response, network lighting controller can process the data packet to determine instructions for each of the lighting devices 241, 242, 243, 211, 231, & 261. Next, the network lighting controller can execute the instructions to cause the lighting devices 241, 242, 243, 211, 231, & 261 to react according to the instructions.

In some embodiments, the host ELC 213 communicates with the network lighting controller based on the lighting network's frame rate. Thus, some embodiments of the network lighting controller expect to receive one data packet per frame, where each data packet includes instructions for each presentation device. For some commands, the host ELC 213 may generate more than one lighting instruction. For example, the host ELC 213 may receive a command indicating that a color of the spotlight 241 should transition from a first color (e.g., red) to a second color (e.g., orange) over a one second time period. However, instructions for the spotlight 241 may not accommodate such color transitions. Thus, the host ELC 213 may generate a number of instructions to complete the command, based on the number of frames it can transmit over the one second time period. The host ELC 213 can use any suitable step function to determine the transition. Using the step function, the host ELC 213 can determine a number of color values for the color transition, and can generate instructions based on the colors values. Next, the host ELC 213 can transmit, in each frame, one instruction for the spotlight 241. When executed, the instructions incrementally transition the spotlight 341 from the first color to the second color over the one second time period.

Sometimes lighting devices do not transition between states (e.g., colors) in every frame. Instead, the lighting devices may remain in a given state over several frames. If a lighting device should remain in a given state, the host ELC 213 can transmit an instruction indicating no change. For example, the host ELC 213 may receive a command indicating that the spotlight 243 should be pointed at the wagering game machine 260 indefinitely. In response, the host ELC 213 can generate an instruction indicating the wagering game machine's 260 position for the spotlight 243, and transmit the instruction to the spotlight 243. During successive frames, the host ELC 213 may transmit "no operation" instructions to the spotlight 243, causing no change to the spotlight 243 (i.e., keeping the light 243 pointing at the wagering game machine 260).

Example Operations

This discussion continues with a description of operations associated with some embodiments of the invention. This discussion will describe the operations as represented in the flow diagrams (a.k.a. flowcharts) of FIGS. 3 and 4. In some instances, the operations are described with reference system components presented above. However, according to some embodiments, the operations can be performed by components that are not described herein. Furthermore, in certain embodiments, the operations described herein can be performed by executing instructions residing on machine-readable storage media (e.g., software). In other embodiments, the operations are performed by hardware, by firmware, or other components. In some embodiments, the operations can be performed in series, while in other embodiments, one or more of the operations can be performed in parallel. Moreover, some embodiments can perform less than all the operations shown in any flow diagram or other drawing.

Figure 3:
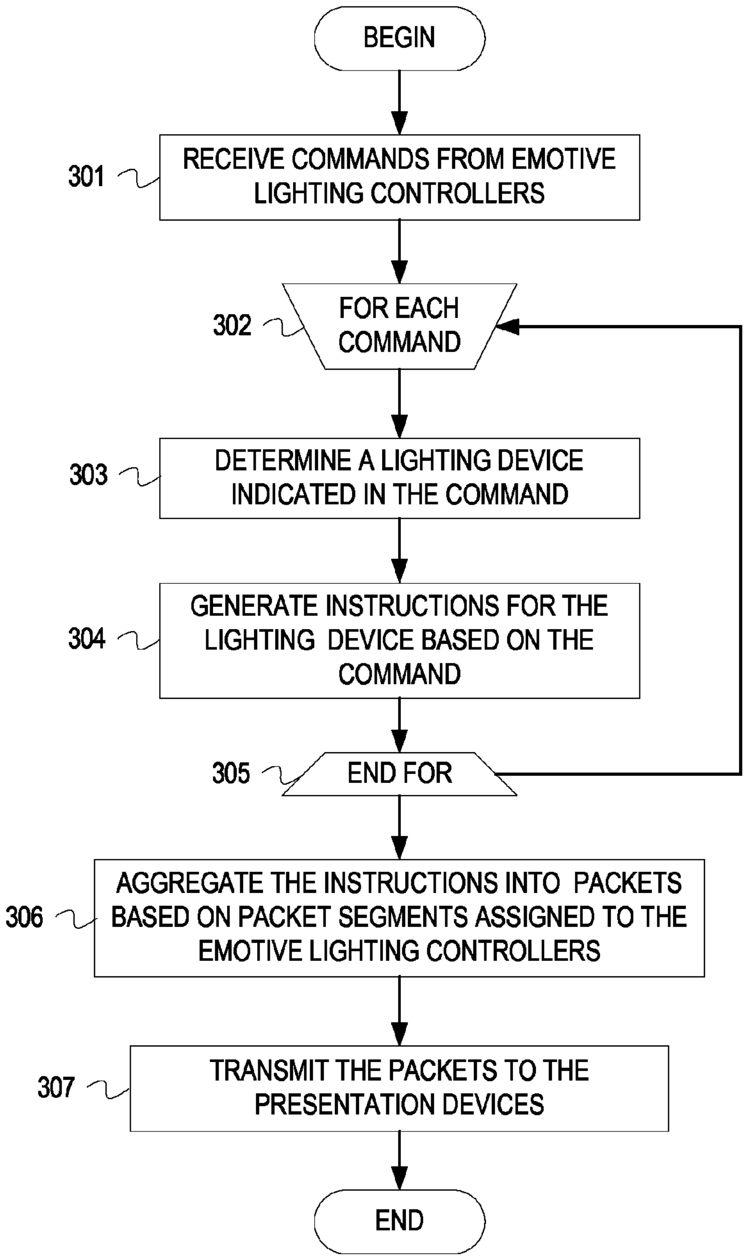
FIG. 3 is a flowchart depicting operations for processing lighting commands, according to some embodiment of the invention.

FIG. 3 is a flowchart depicting operations for processing lighting commands, according to some embodiment of the invention. Flow begins at block 301, where a host ELC receives commands from one or more ELCs. The ELCs can transmit commands to the host ELC in accordance with playlists. The host ELC can also generate commands and deliver the commands to itself (e.g., insert commands into its own input buffer). Each of the ELCs transmits commands for lighting devices that they are responsible for controlling. In some embodiments, all ELCs receive duplicate copies of all the commands, so each ELC can maintain accurate state information. The transmissions are received over a network that is independent of any dedicated lighting network. Furthermore, the Flow continues at block 302.

At block 302, a loop begins for each command received by the host ELC. Flow continues at block 303.

At block 303, the host ELC determines a lighting device indicated in the command. In some instances, the host ELC determines the lighting device based on an identifier (e.g., an integer value) in the command. The host ELC can also determine which ELC that transmitted the command (e.g., based on an integer value or other identifier). Flow continues at block 304.

At block 304, the host ELC generates instructions for the lighting device based on the command. For example, the host ELC may receive a command indicating that brightness of a light should be transitioned from low to high over two seconds. In some instances, the host ELC may also determine an instruction format for the lighting device (e.g., based on the identifier indicated in the command). For a brightness command, more than one instruction may be needed to carry-out the command if the lighting device's instructions only support a single brightness level for each instruction. If multiple instructions are needed for the command, the host ELC determines a number of instructions/frames in the two second time interval, based on a lighting network frame rate. Then, the host ELC determines how much to increment brightness during each frame, and generates instructions to incrementally change the brightness over the two seconds. Flow continues at block 305.

At block 305, the loop for each instruction ends. If the host ELC has received additional commands, flow continues at block 302. If the host ELC has not received additional commands, flow continues at block 306.

At block 306, the host ELC aggregates the instructions into data packets based on packet segments assigned to the ELCs. A single packet can include one instruction for each of the lighting devices associated with a bank of wagering game machines. As described vis-à-vis FIG. 1, the host ELC can insert each ELC's instructions into packet segments reserved for that ELC. Each packet segment may be organized such that a particular lighting device's instructions go in specific bytes of the segment (e.g., the high order five bytes may control a particular spotlight, whereas the next four bytes control an LED array). The host ELC transmits one packet to a network lighting controller per network transmission frame. If a particular command takes more than one instruction to complete, the host ELC can insert successive instructions into successive packets. If a command has not been received for one of the lighting devices, the host ELC can insert instructions indicating that no change should occur for the lighting device. Flow continues at block 307.

At block 307, the host ELC transmits the packets to the lighting devices. For example, the host ELC transmits the packets over an RS-485 cable at a rate of 40 frames/packets per second. In some embodiments, a lighting controller separate from the lighting device receives and executes the instructions, causing the lighting device to carry out the lighting effect (e.g., changing a light's brightness). In other embodiments, the controller is incorporated into the lighting device.

In some embodiments, the ELCs can be listening to the packet transmissions made by the host ELC. The non-host ELCs can record the packets to maintain state information. Thus, the state information can include both the commands and the instructions. If the host ELC becomes unavailable, one of the other ELCs can be selected as host, and the new host ELC can utilize the state information to continue transmitting instructions where the previous host ELC left off.

Figure 4:
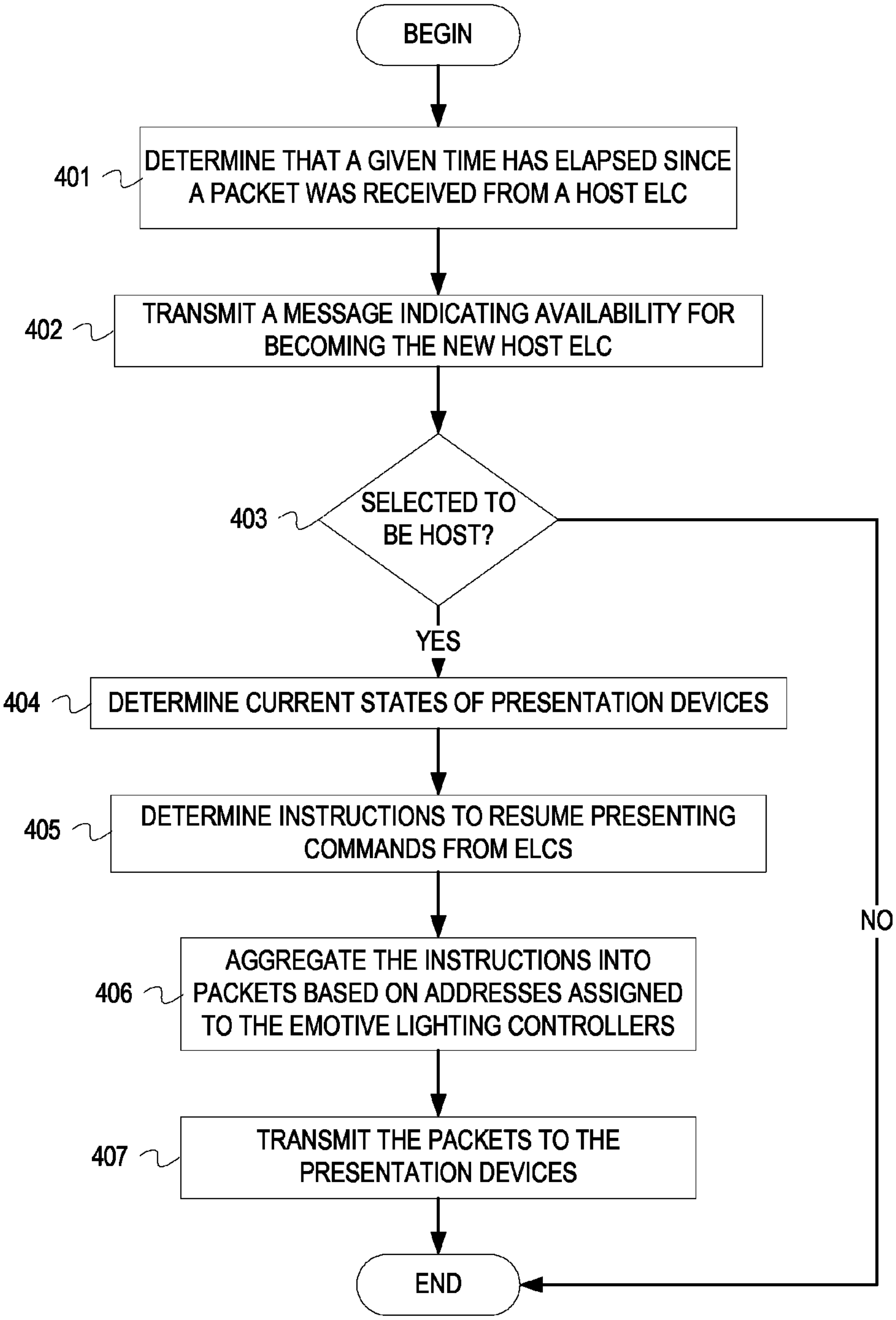
FIG. 4 is a flowchart depicting operations for resuming a presentation after a host ELC becomes unavailable.

FIG. 4 is a flowchart depicting operations for resuming a presentation after a host ELC becomes unavailable. Flow begins at block 401, where an ELC determines that a data packet has not been received from a host ELC for a given time. For example, if the host ELC should be transmitting, over the lighting network 150, data packets at a frame rate of 40 frames/packets per second. If the ELC has not received a data packet for ten seconds (400 frames), the ELC determines that the host ELC is unavailable. Embodiments can be configured to wait any suitable time period before determining a host ELC is not available. Flow continues at block 402.

At block 402, the ELC transmits a message indicating availability for becoming the host ELC. In some instances, the ELC transmits the message to a wagering game server to inform the wagering game server that the ELC is available to become the host. In some embodiments, if there are multiple ELCs, the wagering game server may receive many such messages. However, in other embodiments, the network's communication arbitration policy allows only one available ELC to transmit such a message to the wagering game server. For example, according to one arbitration policy, multiple available ELCs may request to send a message indicating availability to be host. However, only one ELC obtains permission to transmit the message. According to the policy, the ELCs (i.e., the ELCs that did obtain permission to transmit) remove the message from their transmit buffers. Thus, the wagering game server may receive only one message indicating that an ELC is available to become host.

Next, the wagering game server can select one of the ELCs to be the new host. For example, the wagering game server can select the new host based on a round robin, least recently used, most reliable, or any other suitable selection technique. In some embodiments, the wagering game server selects the only ELC from which it received a message. Flow continues at block 403.

At block 403, the ELC determines whether it has been selected to be the host. For example, after the wagering game server selects a new host, the wagering game server sends, to all of the available ELCs, a message identifying the new host. The ELC knows it is the new host if it receives a messaging identifying it as the new host. If the ELC has been selected, flow continues at block 404. If the ELC has not been selected, flow ends.

At block 404, the ELC has been selected as the new host, so the new host ELC determines current states of the lighting devices. As noted above, the previous host ELC broadcast data packets to all ELCs. In some instances, the new host ELC determines the current states based on one or more data packet received from the previous host ELC. Flow continues at block 405.

At block 405, the new host ELC determines which instructions are needed to resume processing of the commands. For example, before the previous host became unavailable, the ELC received commands over a backend network, and it generated instructions based on the commands (as part of a process for maintaining state information). Instead of aggregating and transmitting the instructions, the ELC stored the instructions in memory. Now operating as the new host, the ELC can examine the last packet received from the previous host, and begin transmitting succeeding instructions. Flow continues at block 406.

At block 406, the new host ELC aggregates the instructions into data packets based on packet segments reserved for the ELCs. Aggregating the instructions can comprise determining bytes allocated to the lighting devices in the packet segments of each ELC. Next, the new host ELC can insert the instructions in the appropriate bytes in the packet segments. Flow continues at block 407.

At block 407, the new host ELC transmits the data packets to the lighting devices. In some embodiments, the new host ELC transmits the data packets to lighting controllers separate from the lighting devices. The new host ELC may generate and transmit multiple packets per frame if more than one lighting controller is associated with the lighting devices.

Although some of the foregoing examples refer to ELCs being associated with wagering game machines, embodiments are not so limited. Some ELCs are not associated with any of the wagering game machine, but may reside in a bank of wagering game machines to control overhead devices.

In some instances, a wagering game server, not the ELCs, maintains state information. If the wagering game server detects that a host ELC is unavailable (e.g., via notification from non-host ELCs), it can push state information to new host ELC.

More about Wagering Game Machines

This section includes discussion about wagering game machines and wagering game networks.

Wagering Game Machine Architectures

Figure 5:
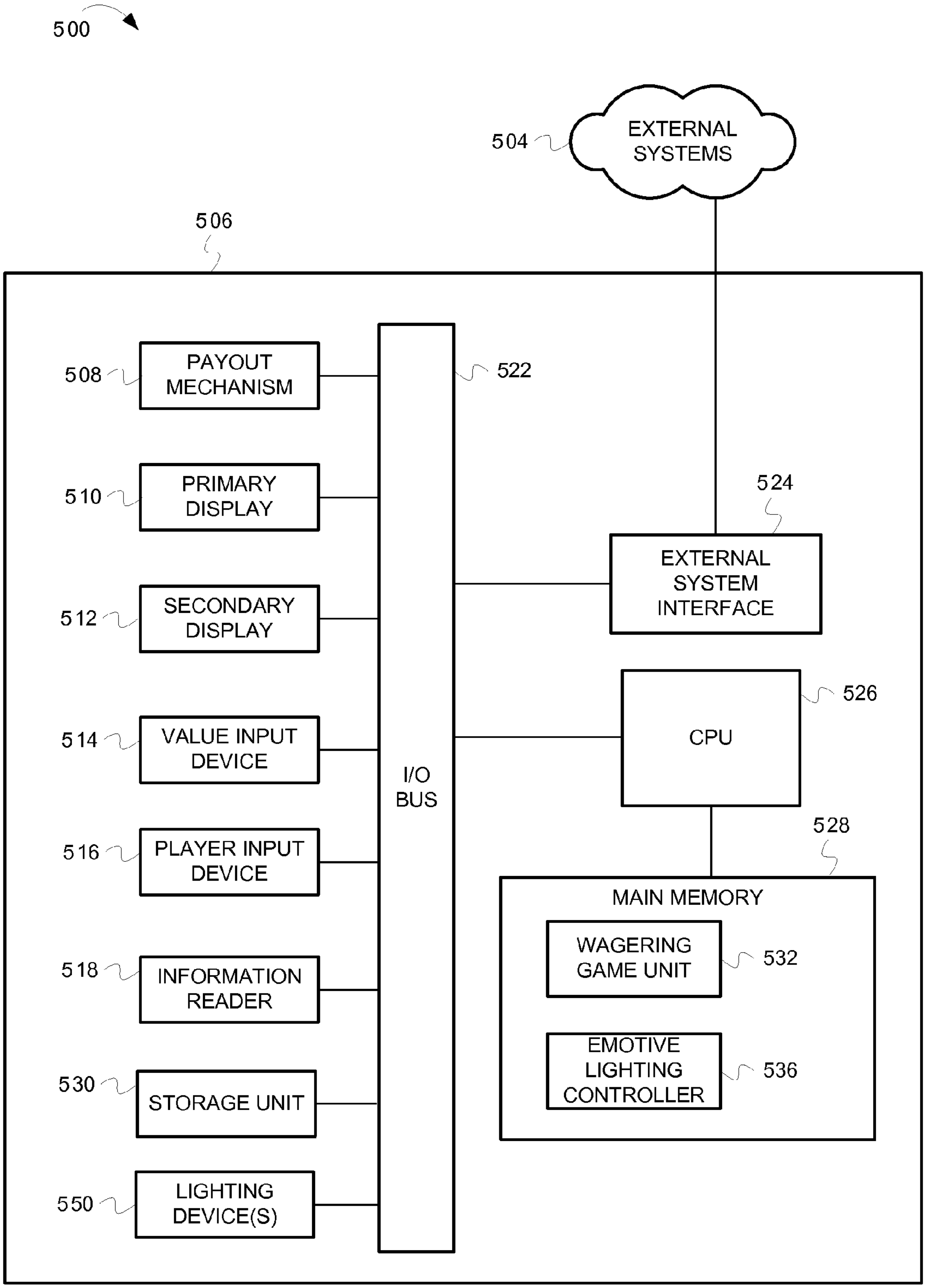
FIG. 5 is a block diagram illustrating a wagering game machine architecture, according to example embodiments of the invention.

FIG. 5 is a block diagram illustrating a wagering game machine architecture, according to example embodiments of the invention. As shown in FIG. 5, the wagering game machine architecture 500 includes a wagering game machine 506, which includes a central processing unit (CPU) 526 connected to main memory 528. The CPU 526 can include any suitable processor, such as an Intel® Pentium processor, Intel® Core 2 Duo processor, AMD Opteron™ processor, or UltraSPARC processor. The main memory 528 includes a wagering game unit 532. In one embodiment, the wagering game unit 532 can present wagering games, such as video poker, video black jack, video slots, video lottery, etc., in whole or part. The main memory also includes an emotive lighting controller 536. The emotive lighting controller 536 is responsible for controlling lighting devices assigned to, proximate to, or in other ways associated with the wagering game machine 506. The emotive lighting controller 536 can be configured to control synchronization data between wagering game machines within a machine bank including synchronization of emotive light presentation data.

The CPU 526 is also connected to an input/output (I/O) bus 522, which can include any suitable bus technologies, such as an AGTL+frontside bus and a PCI backside bus. The I/O bus 522 is connected to a payout mechanism 508, primary display 510, secondary display 512, value input device 514, player input device 516, information reader 518, storage unit 530, and lighting device(s) 550. The player input device 516 can include the value input device 514 to the extent the player input device 516 is used to place wagers. The I/O bus 522 is also connected to an external system interface 524, which is connected to external systems 504 (e.g., wagering game networks).

In one embodiment, the wagering game machine 506 can include additional peripheral devices and/or more than one of each component shown in FIG. 5. For example, in one embodiment, the wagering game machine 506 can include multiple external system interfaces 524 and/or multiple CPUs 526. In one embodiment, any of the components can be integrated or subdivided.

Any component shown in the architecture 500 (or in any other drawing discussed herein) can include hardware, firmware, and/or machine-readable storage media including instructions for performing the operations described herein. Machine-readable storage media includes any mechanism that stores and provides information in a form readable by a machine (e.g., a wagering game machine, computer, etc.). For example, machine-readable storage media include read only memory (ROM), random access memory (RAM), magnetic disk storage media, optical storage media, flash memory machines, etc.

While FIG. 5 describes an example wagering game machine architecture, this section continues with a discussion wagering game networks.

Emotive Lighting Controllers

Figure 6:
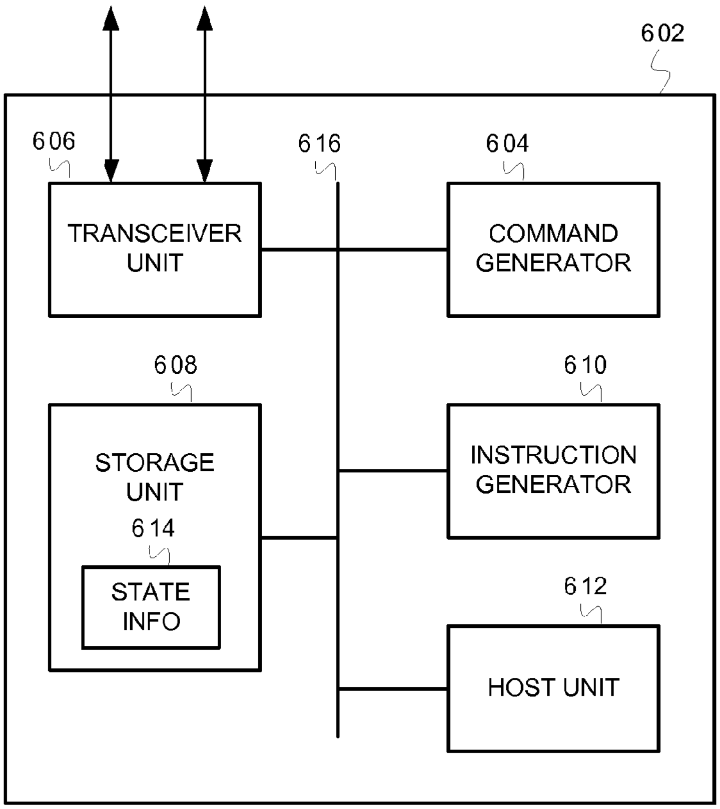
FIG. 6 is a block diagram illustrating a wagering game network 1000, according to example embodiments of the invention.

FIG. 6 is a block diagram illustrating an emotive lighting controller, according to some embodiments of the invention. In FIG. 6, an emotive lighting controller 602 includes a transceiver unit 606, host unit 612, command generator 604, instruction generator 610, storage unit 608. As shown, the components can communicate with each other via the communication interface 316, which can include a bus, wires, software interfaces, and/or any other suitable interface technology.

The transceiver unit 606 can transmit and receive data (e.g., playlists, instructions, commands, etc.) over a plurality of networks. In some instances, the transceiver unit 606 responds to requests from the ELC's other components, and utilizes the storage unit 608.

The host unit 612 determines whether the ELC 602 is in host mode or non-host mode. If the ELC 602 is in host mode, the host unit 612 controls receipt of lighting commands, and generation of lighting device instructions. The host unit 612 can retrieve the commands from the storage unit 608, and initiate the instruction generator 610 to generate lighting device instructions based on the commands. The instruction generator 610 can employ step functions and other methods for determining instructions. The host unit 612 can transmit the instructions for execution on lighting devices. The host unit 612 can also utilize the command generator to generate commands based on playlist.

If the ELC 602 is in non-host mode, the host unit 612 utilizes the transceiver unit 606 to receive commands from other non-host ELCs. The host unit 612 can store the commands as state information in the storage unit 608. If a designated host ELCs becomes unavailable, the host unit 612 can offer to become host, and utilize the state information 614 if the ELC 602 becomes host.

In some embodiments, one or more of the components shown in FIG. 6 can be part of a wagering game machine or other wagering game network components. For example, all the components may reside in a wagering game machine or wagering game server. The components shown in FIG. 6 can perform any of the operations described herein. Furthermore, the ELC's components can include hardware and/or machine-readable storage media including instructions that can be executed to perform the operations described herein. For example, the host unit 612 can be embodied as software executing on a processor (e.g., a processor residing in a wagering game machine).

Wagering Game Networks

Figure 7:
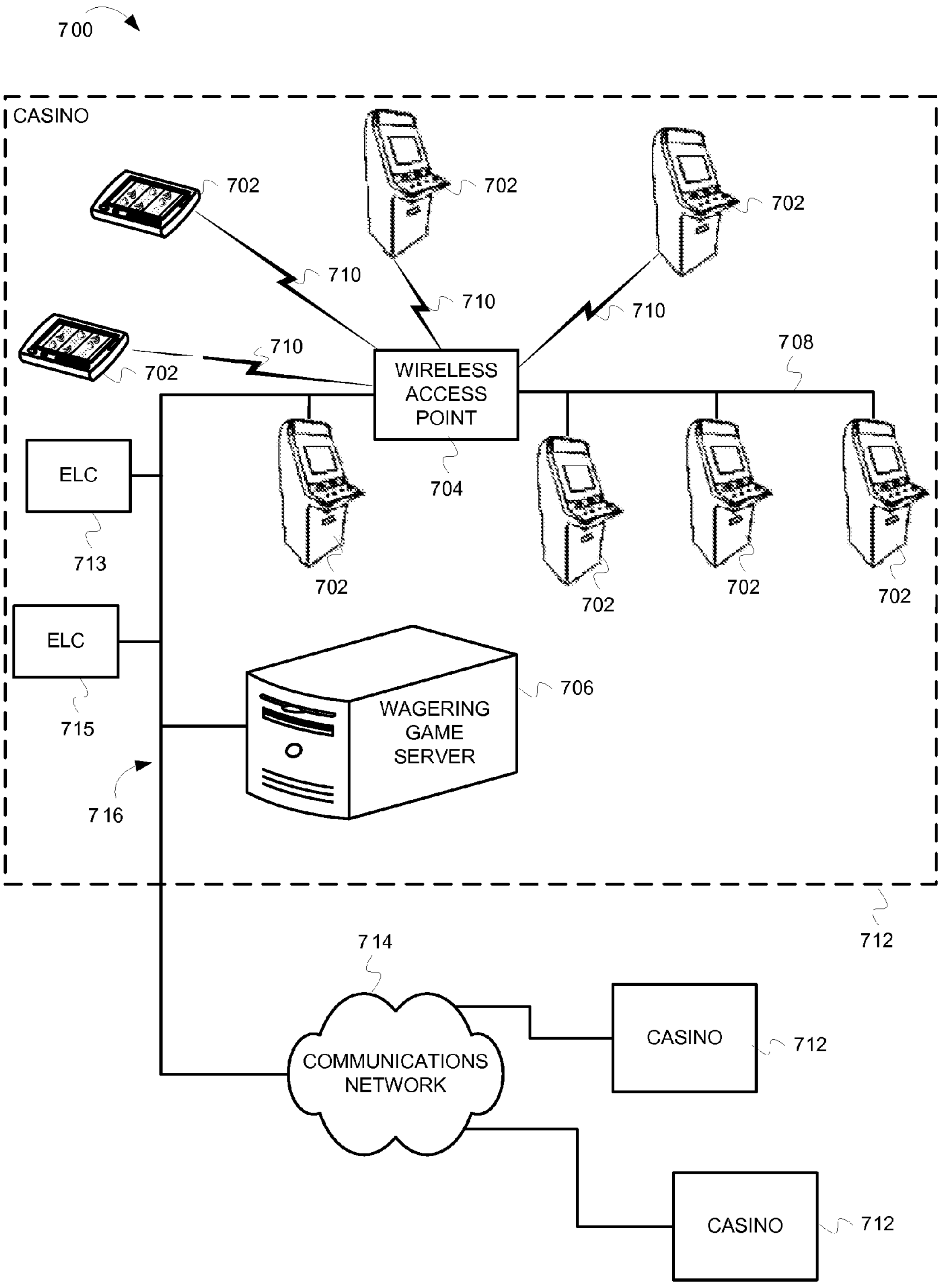
FIG. 7 is a perspective view of a wagering game machine, according to example embodiments of the invention.

FIG. 7 is a block diagram illustrating a wagering game network 700, according to example embodiments of the invention. As shown in FIG. 7, the wagering game network 700 includes a plurality of casinos 712 connected to a communications network 714.

Each casino 712 includes a local area network 716, which includes an access point 704, a wagering game server 706, and wagering game machines 702. The access point 704 provides wireless communication links 710 and wired communication links 708. The wired and wireless communication links can employ any suitable connection technology, such as Bluetooth, 802.11, Ethernet, public switched telephone networks, SONET, etc. In some embodiments, the wagering game server 706 can serve wagering games and distribute content to devices located in other casinos 712 or at other locations on the communications network 714. Each casino can also include a lighting network separate from the local area network 716.

The wagering game machines 702 described herein can take any suitable form, such as floor standing models, handheld mobile units, bartop models, workstation-type console models, etc. Further, the wagering game machines 702 can be primarily dedicated for use in conducting wagering games, or can include non-dedicated devices, such as mobile phones, personal digital assistants, personal computers, etc. In one embodiment, the wagering game network 700 can include other network devices, such as accounting servers, wide area progressive servers, player tracking servers, and/or other devices suitable for use in connection with embodiments of the invention.

In some embodiments, wagering game machines 702 and wagering game servers 706 work together such that a wagering game machine 702 can be operated as a thin, thick, or intermediate client. For example, one or more elements of game play may be controlled by the wagering game machine 702 (client) or the wagering game server 706 (server). Game play elements can include executable game code, lookup tables, configuration files, game outcome, audio or visual representations of the game, game assets or the like. In a thin-client example, the wagering game server 706 can perform functions such as determining game outcome or managing assets, while the wagering game machine 702 can present a graphical representation of such outcome or asset modification to the user (e.g., player). In a thick-client example, the wagering game machines 702 can determine game outcomes and communicate the outcomes to the wagering game server 706 for recording or managing a player's account.

In some embodiments, either the wagering game machines 702 (client) or the wagering game server 706 can provide functionality that is not directly related to game play. For example, account transactions and account rules may be managed centrally (e.g., by the wagering game server 706) or locally (e.g., by the wagering game machine 702). Other functionality not directly related to game play may include power management, presentation of advertising, software or firmware updates, system quality or security checks, etc.

Each casino also includes one or more ELC (see 713 & 715) capable of controlling light shows, as described herein.

Any of the wagering game network components (e.g., the wagering game machines 702) can include hardware and machine-readable storage media including instructions for performing the operations described herein.

Wagering Game Machines

Figure 8:
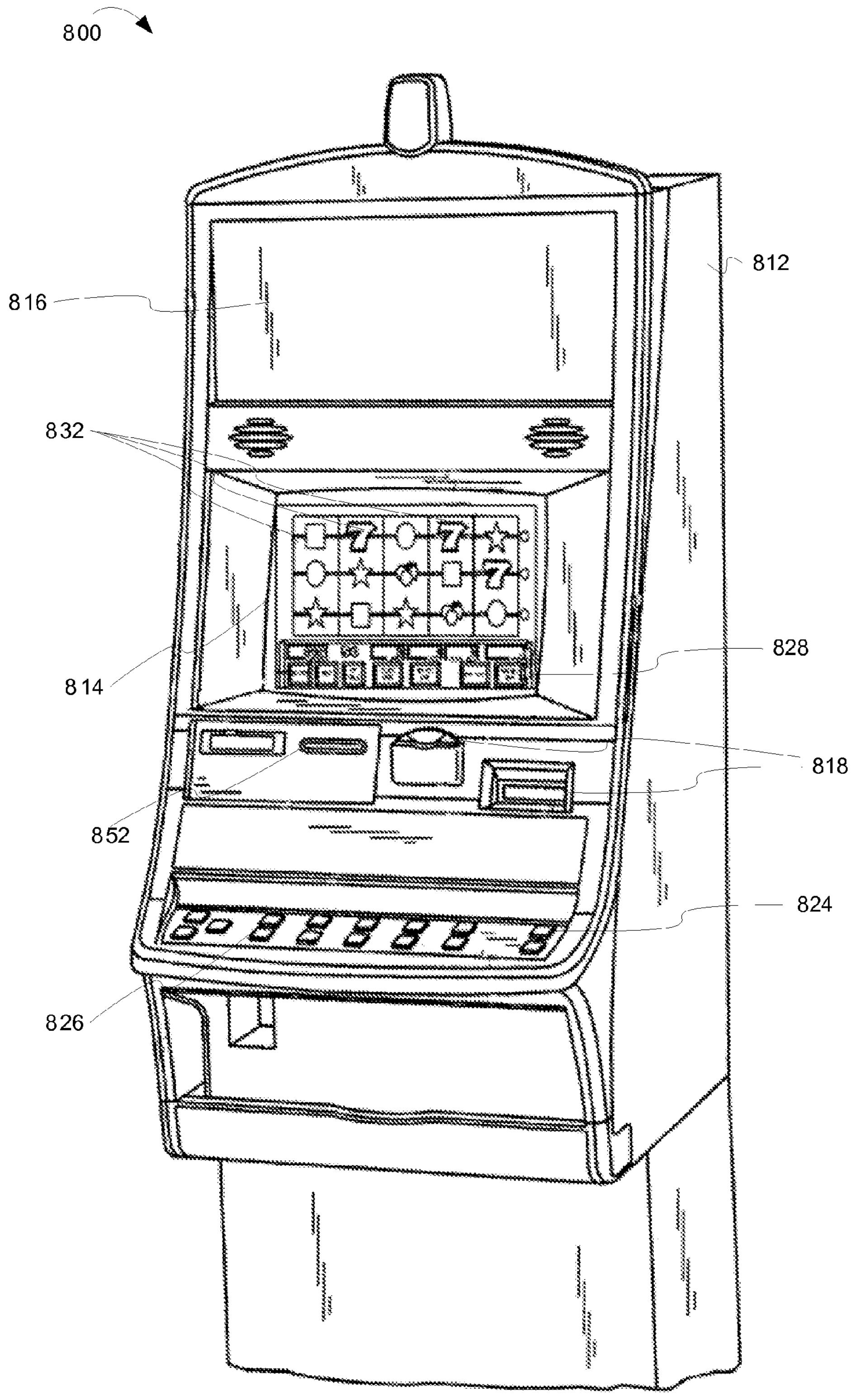
FIG. 8 is a perspective view of a wagering game machine, according to example embodiments of the invention.

FIG. 8 is a perspective view of a wagering game machine, according to example embodiments of the invention. Referring to FIG. 8, a wagering game machine 800 is used in gaming establishments, such as casinos. According to embodiments, the wagering game machine 800 can be any type of wagering game machine and can have varying structures and methods of operation. For example, the wagering game machine 800 can be an electromechanical wagering game machine configured to play mechanical slots, or it can be an electronic wagering game machine configured to play video casino games, such as blackjack, slots, keno, poker, blackjack, roulette, etc.

The wagering game machine 800 comprises a housing 812 and includes input devices, including value input devices 818 and a player input device 824. For output, the wagering game machine 800 includes a primary display 814 for displaying information about a basic wagering game. The primary display 814 can also display information about a bonus wagering game and a progressive wagering game. The wagering game machine 800 also includes a secondary display 816 for displaying wagering game events, wagering game outcomes, and/or signage information. While some components of the wagering game machine 800 are described herein, numerous other elements can exist and can be used in any number or combination to create varying forms of the wagering game machine 800.

The value input devices 818 can take any suitable form and can be located on the front of the housing 812. The value input devices 818 can receive currency and/or credits inserted by a player. The value input devices 818 can include coin acceptors for receiving coin currency and bill acceptors for receiving paper currency. Furthermore, the value input devices 818 can include ticket readers or barcode scanners for reading information stored on vouchers, cards, or other tangible portable storage devices. The vouchers or cards can authorize access to central accounts, which can transfer money to the wagering game machine 800.

The player input device 824 comprises a plurality of push buttons on a button panel 826 for operating the wagering game machine 800. In addition, or alternatively, the player input device 824 can comprise a touch screen 828 mounted over the primary display 814 and/or secondary display 816.

The various components of the wagering game machine 800 can be connected directly to, or contained within, the housing 812. Alternatively, some of the wagering game machine's components can be located outside of the housing 812, while being communicatively coupled with the wagering game machine 800 using any suitable wired or wireless communication technology.

The operation of the basic wagering game can be displayed to the player on the primary display 814. The primary display 814 can also display a bonus game associated with the basic wagering game. The primary display 814 can include a cathode ray tube (CRT), a high resolution liquid crystal display (LCD), a plasma display, light emitting diodes (LEDs), or any other type of display suitable for use in the wagering game machine 800. Alternatively, the primary display 814 can include a number of mechanical reels to display the outcome. In FIG. 8, the wagering game machine 800 is an "upright" version in which the primary display 814 is oriented vertically relative to the player. Alternatively, the wagering game machine can be a "slant-top" version in which the primary display 814 is slanted at about a thirty-degree angle toward the player of the wagering game machine 800. In yet another embodiment, the wagering game machine 800 can exhibit any suitable form factor, such as a free standing model, bar top model, mobile handheld model, or workstation console model.

A player begins playing a basic wagering game by making a wager via the value input device 818. The player can initiate play by using the player input device's buttons or touch screen 828. The basic game can include arranging a plurality of symbols along a payline 832, which indicates one or more outcomes of the basic game. Such outcomes can be randomly selected in response to player input. At least one of the outcomes, which can include any variation or combination of symbols, can trigger a bonus game.

In some embodiments, the wagering game machine 800 can also include an information reader 852, which can include a card reader, ticket reader, bar code scanner, RFID transceiver, or computer readable storage medium interface. In some embodiments, the information reader 852 can be used to award complimentary services, restore game assets, track player habits, etc.

Although not shown in FIG. 8, the wagering game machine 800 can include one or more ELCs. Additionally, the machine 800 can include lighting devices capable of presenting lighting effects, as described herein.

General

Embodiments of the inventive subject matter can include any combination of the functionality and structure described herein. Furthermore, this detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. In addition to these examples, other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A computer-implemented method for presenting a lighting show in a wagering game system, the method comprising:

receiving, over a first network, a playlist identifier that identifies a playlist, wherein the playlist is associated with a first group of lighting commands for presenting lighting effects on a plurality of lighting devices of the wagering game system;

generating, by at least one processor of the wagering game system, the first group of lighting commands based on the identified playlist;

receiving, over the first network, a second group of lighting commands for presenting the lighting effects on the plurality of lighting devices of the wagering game system;

generating, by the at least one processor of the wagering game system and based on the first and second groups of lighting commands, a plurality of lighting instructions specific to the plurality of lighting devices; and transmitting, over a second network different from the first network, the plurality of lighting instructions for execution by one or more lighting controllers connected to the plurality of lighting devices, wherein the execution causes the lighting effects to present the lighting show.

2. The computer-implemented method of claim 1, wherein the generating the plurality of lighting instructions specific to the plurality of lighting devices includes:

generating, for at least one of the lighting commands of the first group and the second group, two or more of the lighting instructions for the plurality of lighting instructions, wherein the generating is based on a step function.

3. The computer-implemented method of claim 1, wherein the playlist is associated with a wagering game occurring on the wagering game system.

4. The computer-implemented method of claim 1, wherein the first network supports Ethernet protocol, and wherein the second network supports DMX512 protocol.

5. The computer-implemented method of claim 1, wherein the plurality of lighting devices are located on and about wagering game machines of the wagering game system.

6. One or more machine-readable memory devices storing thereon machine-readable instructions which, when executed by a machine, cause the machine to perform operations comprising:

receiving, over a backend network, a plurality of lighting commands for a lighting show, wherein the lighting show is associated with an event occurring in a wagering game system;

for each lighting command of the plurality of lighting commands for the lighting show, performing the following:

determining a lighting device of the wagering game system that is associated with the command; and generating, based on the command, one or more lighting instructions for the determined lighting device;

aggregating each of the lighting instructions into one or more data packets; and transmitting, over a dedicated lighting network different from the backend network, the one or more data packets to one or more lighting controllers of the wagering game system configured to present the lighting show by executing the lighting instructions.

7. The one or more machine-readable memory devices of claim 6, wherein the lighting show includes a plurality of lighting effects, and wherein generating the one or more lighting instructions for each of the lighting devices includes:

determining lighting parameters based on a step function associated with one or more of the lighting effects, wherein the one or more lighting instructions include the lighting parameter.

8. The one or more machine-readable memory devices of claim 6, wherein the dedicated lighting network supports DMX512 protocol, and wherein the backend network supports Ethernet protocol.

9. The one or more machine-readable memory devices of claim 6, wherein the lighting device includes one or more of a light emitting diode array, a spot light, slot-reel lighting, and chair lighting.

10. The one or more machine-readable memory devices of claim 6, wherein the event is one of a wagering game jackpot win, a progressive jackpot win, and a player achievement.

11. A wagering game machine configured to present a light show, the wagering game machine comprising:

means for receiving, over a first network, a playlist identifier that identifies a playlist, wherein the playlist is associated with a first group of lighting commands for presenting lighting effects on a plurality of lighting devices coupled to a wagering game system;

means for generating the first group of lighting commands based on the identified playlist;

means for receiving, over the first network, a second group of lighting commands for presenting the lighting effects on the plurality of lighting devices coupled to the wagering game system;

means for generating, based on the first and second groups of lighting commands, a plurality of lighting instructions specific to the plurality of lighting devices; and means for transmitting, over a second network different from the first network, the plurality of lighting instructions for execution by one or more lighting controllers connected to the plurality of lighting devices, wherein the execution causes the lighting effects to present the lighting show.

12. The wagering game machine of claim 11, wherein the means for generating the plurality of lighting instructions specific to the plurality of lighting devices includes:

means for generating, for at least one of the lighting commands of the first group and the second group, two or more of the lighting instructions for the plurality of lighting instructions, wherein the generating is based on a step function.

13. The wagering game machine of claim 11, wherein the playlist is associated with a wagering game occurring on the wagering game system.

14. The wagering game machine of claim 11, wherein the first network supports Ethernet protocol, and wherein the second network supports DMX512 protocol.

15. The wagering game machine of claim 11, wherein the plurality of lighting devices are located on and about wagering game machines coupled to the wagering game system.

* * * * *